(12) United States Patent
Accapadia et al.

(10) Patent No.: US 9,875,145 B2
(45) Date of Patent: Jan. 23, 2018

(54) LOAD BASED DYNAMIC RESOURCE SETS

(71) Applicant: International Business Machines Corporation, Armonk, NY (US)

(72) Inventors: Mathew Accapadia, Austin, TX (US); Adekunle Bello, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 14/098,153

(22) Filed: Dec. 5, 2013

(65) Prior Publication Data

US 2015/0160977 A1      Jun. 11, 2015

(51) Int. Cl.
   *G06F 9/46*       (2006.01)
   *G06F 9/50*       (2006.01)

(52) U.S. Cl.
   CPC .... *G06F 9/5083* (2013.01); *G06F 2209/5011* (2013.01); *G06F 2209/5012* (2013.01); *G06F 2209/5022* (2013.01)

(58) Field of Classification Search
   CPC .............................................. G06F 2209/5012
   See application file for complete search history.

(56) References Cited

U.S. PATENT DOCUMENTS

| | | | |
|---|---|---|---|
| 6,658,448 B1 * | 12/2003 | Stefaniak | G06F 9/5033 712/1 |
| 6,996,822 B1 * | 2/2006 | Willen | G06F 9/5033 711/100 |
| 8,060,883 B1 * | 11/2011 | Rao | G06F 9/5077 709/226 |
| 8,112,757 B2 | 2/2012 | Alford, Jr. | |
| 2003/0019011 A1 | 1/2003 | Cheng | |
| 2004/0010545 A1 | 1/2004 | Pandya | |
| 2005/0108713 A1 * | 5/2005 | Geye | G06F 9/5033 718/100 |
| 2007/0169127 A1 * | 7/2007 | Kashyap | G06F 9/5077 718/104 |

(Continued)

FOREIGN PATENT DOCUMENTS

WO      2005106659 A1      11/2005

OTHER PUBLICATIONS

Realtime Paradigms Needed Post Ada 2005 Stephen Michell, Luke Wong, Brad Moore Published: 2010.*

(Continued)

*Primary Examiner* — Emerson Puente
*Assistant Examiner* — Paul Mills
(74) *Attorney, Agent, or Firm* — Terrile, Cannatti, Chambers & Holland, LLP; Robert W. Holland (57) ABSTRACT

A method, system and computer-usable medium are disclosed for dynamic load based resource sets that provide flexible assignment of resources to processes with nested resource sets. Resource sets include plural resource subsets so that processes that are assigned to a resource subset can have additional resources flexibly made available by providing additional resources from a parent resource set. A resource threshold is monitored to selectively adjust process resource subset assignments based upon utilization of resources within a resource subset, such as by comparing the number of threads assigned to a resource subset with the number processors available to run the threads.

12 Claims, 5 Drawing Sheets

(56) References Cited

U.S. PATENT DOCUMENTS

| | | | |
|---|---|---|---|
| 2009/0187915 A1* | 7/2009 | Chew | G06F 9/5033 718/104 |
| 2011/0231853 A1* | 9/2011 | Murray | H04L 12/24 718/103 |
| 2011/0247002 A1 | 10/2011 | Salapura et al. | |
| 2013/0326064 A1* | 12/2013 | Gulati | G06F 9/5061 709/226 |
| 2014/0047201 A1* | 2/2014 | Mehta | G06F 13/00 711/158 |
| 2014/0067985 A1* | 3/2014 | Lowry | G06F 9/5061 709/213 |
| 2014/0082201 A1* | 3/2014 | Shankari | H04L 47/70 709/226 |

OTHER PUBLICATIONS

Hierarchical Partitioning Techniques for Structured Adaptive Mesh Refinement Applications, Xiaolin Li and Manish Parashar, Published: 2003.*

Hierarchical Load Balancing in Large Distributed Systems Nicola G. Anderson Michael B. Herold Robin Sharp Published: 2008.*

* cited by examiner

LOAD BASED DYNAMIC RESOURCE SETS

BACKGROUND OF THE INVENTION

Field of the Invention

The present invention relates in general to the field of computers and similar technologies, and in particular to software utilized in this field. Still more particularly, it relates to a method, system and computer-usable medium for load based dynamic resources sets.

Description of the Related Art

Often computer systems execute multiple processes simultaneously on multiple resources. For example, an application generates multiple threads that execute simultaneously on multiple processors to process information more rapidly. In some instances, multiple processors coordinate to execute processes through embedded hardware or firmware under the management of an operating system, such as a Unix based operating system that manages processes run on a multi-core central processing unit (CPU). In other instances, management software coordinates execution of multiple processes across multiple computer systems, each of which has multiple CPUs with multiple cores, such as hypervisor or similar virtual machine operating system that manages execution of virtual machines on networked servers.

One difficulty with distributed execution of an application or other process in a multi-processor environment is that the overhead associated with managing execution of instructions can become complex. Another difficulty is that processes with lower priorities may consume excessive amounts of resources and thereby negatively impact the execution of higher priority processes. One solution to these difficulties is the use of resource sets. Resource sets restrict an application's threads to run on only a specified processor or set processors. The identifiers for the processor(s) that a process is allowed to run on are specified at the time that the resource set is defined or created. Using resource sets tends to improve processor and cache affinity and isolates workloads for better control. A disadvantage of resources sets is that multiple workloads can become unbalanced across available resources. For instance, the number of threads associated with a process sometimes grows in unpredictable manners as new threads are created by the process or the load generated by existing threads grows unexpectedly. Different rates of resource use by different processes in different resource sets can sometimes result in overloaded resources that hurt performance for some processes while other resources are underutilized.

SUMMARY OF THE INVENTION

A method, system and computer-usable medium are disclosed for managing resources with resource sets in a multi-process environment. A resource set includes nested subsets of resources so that a process executing on a subset of resources may run on additional resources of the resource set if a resource threshold is met.

Plural resource sets are defined, such as plural sets of one or more processors configured to execute one or more processes having one or more threads. The resources sets are further defined to include one or more subsets that each include at least a portion of their parent resource set. As processes are created to run on the resources, such as by initiation of applications from memory, the processes are restricted to selected resources subsets. For example, a process is provided with an identifier for a resource subset that limits the resources available to the process to those of the resource subset. Execution of the process is monitored to detect a resource threshold and, in response to determining the resource threshold, the process has additional resources made available for execution by providing resources from a parent resource set of the resource subset assigned to the process. For example, if the number of runnable threads assigned to run in a resource subset is greater than the number of processors for a predetermined number of intervals, then some or all of the threads are provided with access to the resources of the resource set to which the resource subset belongs. Alternatively, once a resource threshold is detected, new threads generated by a process having a resource subset are assigned to the resource set to which the resource subset belongs until the new threads expire. Flexible assignments of processes to nested resource sets improves resource utilization while maintaining the advantages of restricting processes to resource sets.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method, system and computer-usable medium are disclosed for load based dynamic resource sets that provide flexible assignments of processes through nested resource sets for more efficient system resource utilization.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
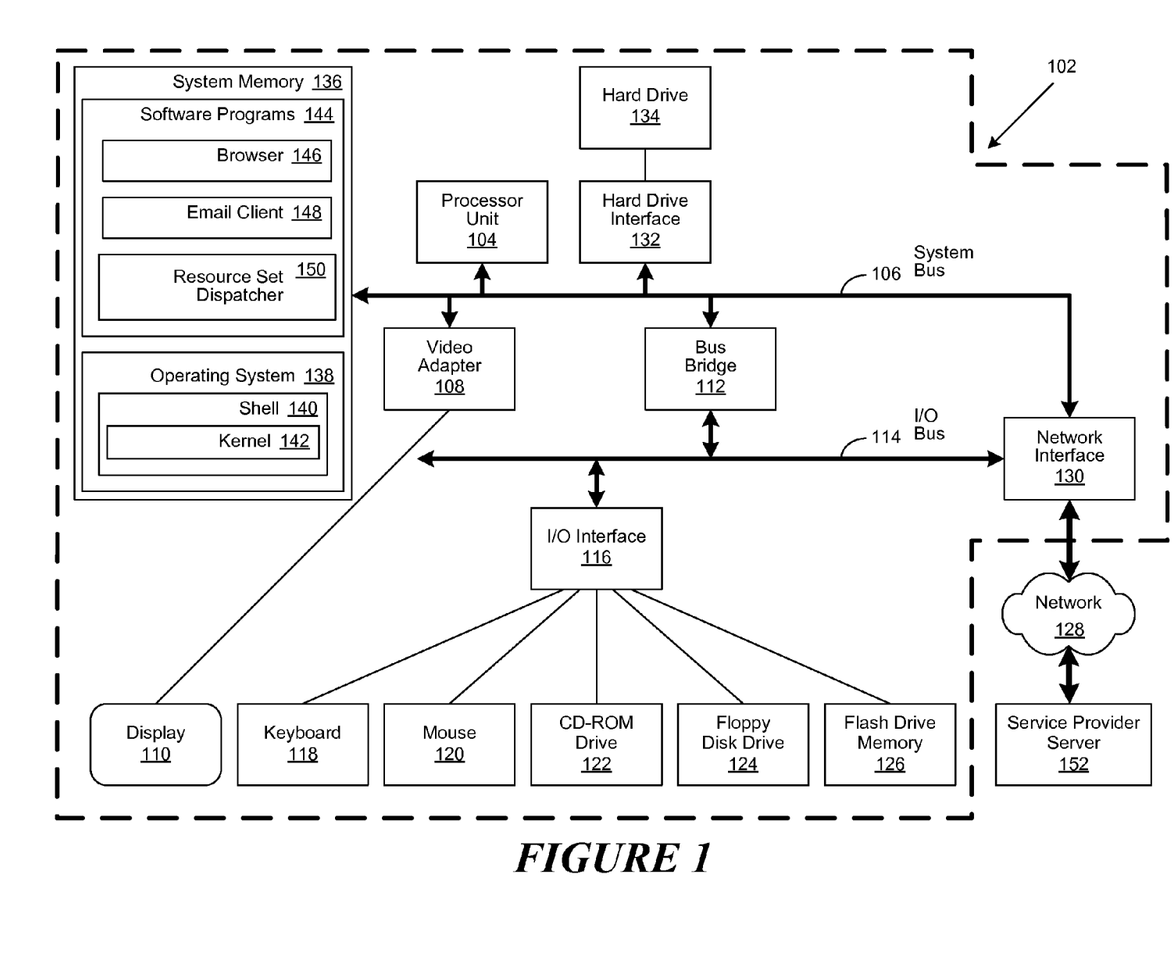
FIG. 1 depicts an exemplary client computer in which the present invention may be implemented.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., client computer 102) to send and receive network messages to the Internet using Hyper-Text Transfer Protocol (HTTP) messaging, thus enabling communication with service provider server 152. In various embodiments, software programs 144 may also include a resource set dispatcher 150. In these and other embodiments, the resource set dispatcher 150 includes code for implementing the processes described hereinbelow. In one embodiment, client computer 102 is able to download the resource set dispatcher 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

Figure 2:
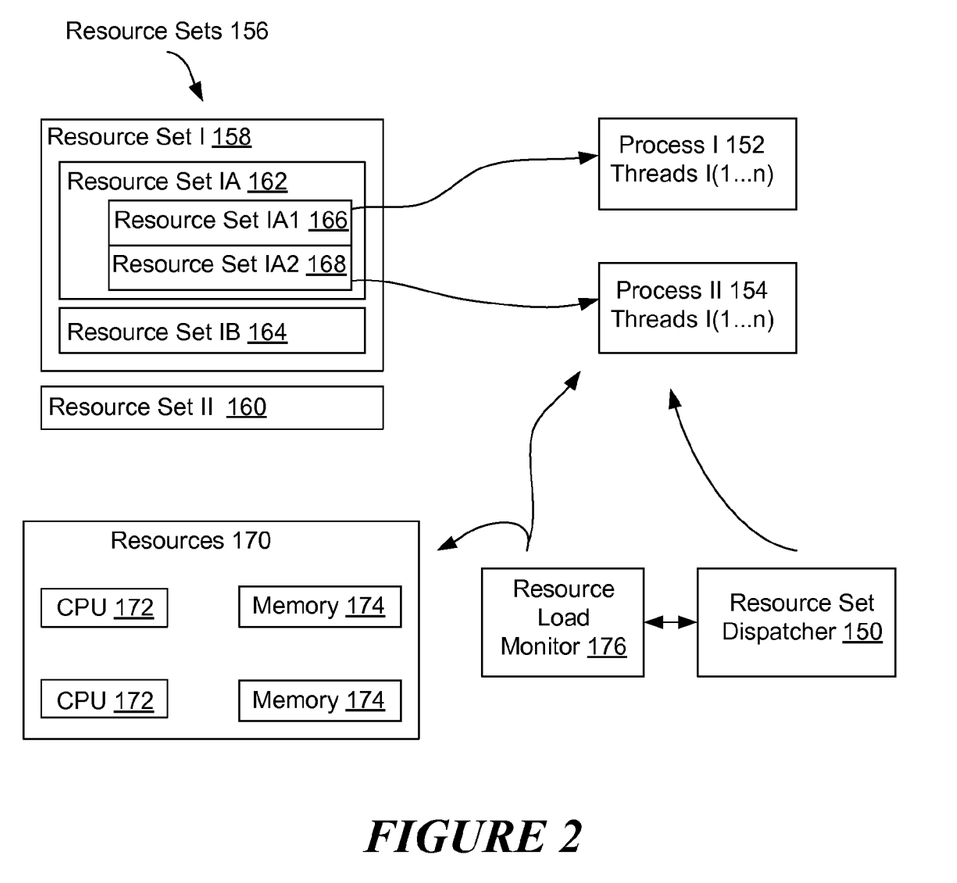
FIG. 2 is a simplified block diagram of resource sets that restrict processes to execution on defined resources in a flexible manner.

FIG. 2 is a simplified block diagram of resource sets that restrict processes to execution on defined resources in a flexible manner. Resource set dispatcher 150 assigns resource sets to applications, such as process I 152 and process II 154, so that the applications are restricted to execute only on the resources within the assigned resource set. Resource set dispatcher 150 is, for example, a module running in a Unix-based operating system that manages assignment of processes to processors or a module in other types of operating systems, such as a hypervisor that manages assignments of virtual machines. Resource set dispatcher 150 restricts processes to selected of nested resource sets 156 so that a process runs its threads on only resources of the process' assigned resource set. In the example embodiment, resources are divided into a first resource set I 158 and a second resource set II 160. Resource set I 158 has nested resource subsets including a resource set IA 162 and resource set IB 164, with resource set IA 162 further nested into resource sets IA1 166 and resource set IA2 168. Each resource subset includes a list of resources 170, such as processors 172 listed by identifier and memory 174 listed by blocks. In operation, resource set dispatcher 150 assigns a process to a resource set or subset so that the process is restricted to execution by resources listed in the resource set or subset, such as by processor identifiers. As an example, process I 152 is assigned to resource set IA1 166 and process II 154 is assigned to resource set IA2 168. In the example embodiment, although process I 152 and process II 154 share the resources of resource set IA 162, the next subsets define resources so that each process has unique resources on which to execute. If one of process I 152 and process II 154 is busy while the other is idle, then one of resource set IA1 166 and IA2 168 could become over utilized while the other is idle.

During operations with processes executing on resources restricted by resource sets, a resource load monitor 176 executes in cooperation with resource set dispatcher 150 to monitor the load on each resource set so that resource set dispatcher 150 can flexibly adjust resource set assignments responsive to detected resource load. When resource load monitor 176 detects a load that exceeds available resource of a resource set, additional resources are selectively made available, such as adjusting the load to use a nested parent resource set of the overloaded resource set. For example, if process I 152 overloads the resources of resource set Ia1 166, then resource set IA 162 is assigned to process I 152 so that the load is shared with the resource set IA2 168. Alternatively, resource set I 158 is assigned, which makes all of the children of the nested resource set available for execution of process I 158. In one embodiment, process I 152 continues to reference the same resource set identifier and resource set dispatcher 150 redefines the resources in the resource set identifier to include the nested resource set. In an alternative embodiment, resource set dispatcher includes the processor identifiers of the nested resource set with the assigned resource set so that all resources are available to process I 152. In one embodiment, resources are temporarily borrowed to address workload imbalances and then the workload continues with the original resource set.

In one embodiment, if the load level of a resource set is so high that all processors in the resource set stay busy for a tunable threshold amount of time and there are threads remaining to execute, then waiting threads are dispatched to the next higher nested resource set. If all processors in that higher level nested resource set are busy for the tunable threshold, then waiting threads are dispatched to yet another higher nested resource set. For example, an operating system determines resource set load at fixed periodic intervals, such as every second or every 10 milliseconds. If the number of runnable threads exceeds the number of processors in that resource set, then the operating system can selectively dispatch threads that are waiting for processors to other processors outside the resource set. The determination to expand the resource set up the nested resource set tree is based on a number of factors, such as the number of consecutive intervals that there have been more runnable threads than processors. Another factor is determined by the number of runnable threads minus the number of processors available in the resource set; if the difference exceeds a tunable threshold, then only the waiting threads are dispatched up the nested resource set tree. Once dispatched to the next higher resource set, threads migrate back to the originating resource thread after the thread have gone to sleep and then woken up again, provided adequate resources are available in the originating resource set. Another factor is the utilization of resources in other resource sets, such as outside the nested resource set. For example, resources of external resource sets may be borrowed on a temporary basis rather than re-assigning threads to nested resource sets, especially if the parent of the nested resource sets has a high resource usage.

Figure 3:
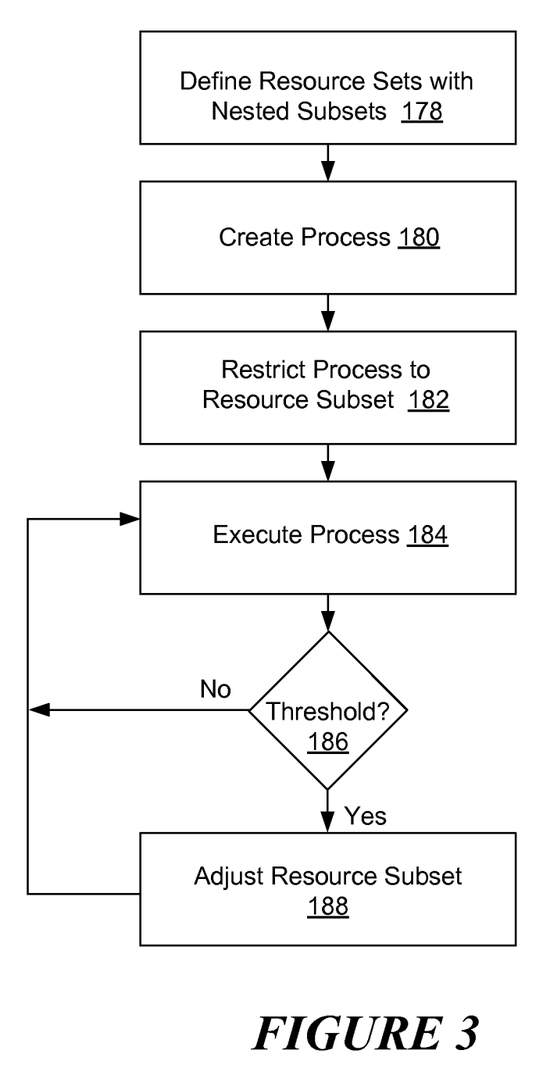
FIG. 3 is a generalized flowchart of the operation of a resource set dispatcher that flexibly assigns processes to resource sets.

FIG. 3 is a generalized flowchart of the operation of a resource set dispatcher that flexibly assigns processes to resource sets. The process starts at step 178 by defining resource sets to include plural resource subsets. At step 180, a process is created, such as by initiating an application which, in turn, initiates multiple threads. At step 182, the process is restricted to execute only on a defined resource subset, such as by providing the process with processor identifiers of the assigned resource subset. At step 184, the process executes restricted to the resources of the assigned resource subset. At step 186, a determination is made of whether a resource set threshold is met, such as by determining a predetermined number of time intervals where runnable threads exceed available processors or where the difference between runnable threads and processors exceeds a predetermined amount. If a threshold is not met, the process returns to step 184 to execute. If the threshold is met, the process continues to step 188 to adjust the resource subset within its nested tree to a higher resource set so that additional resources are made available. A reset of resource subsets might be accomplished by redefining resources in a resources subset name to include more resources or by redefining processes or threads to have assignments to the next higher resource set in the nested tree. The process then returns to step 184 to continue execution.

Figure 4:
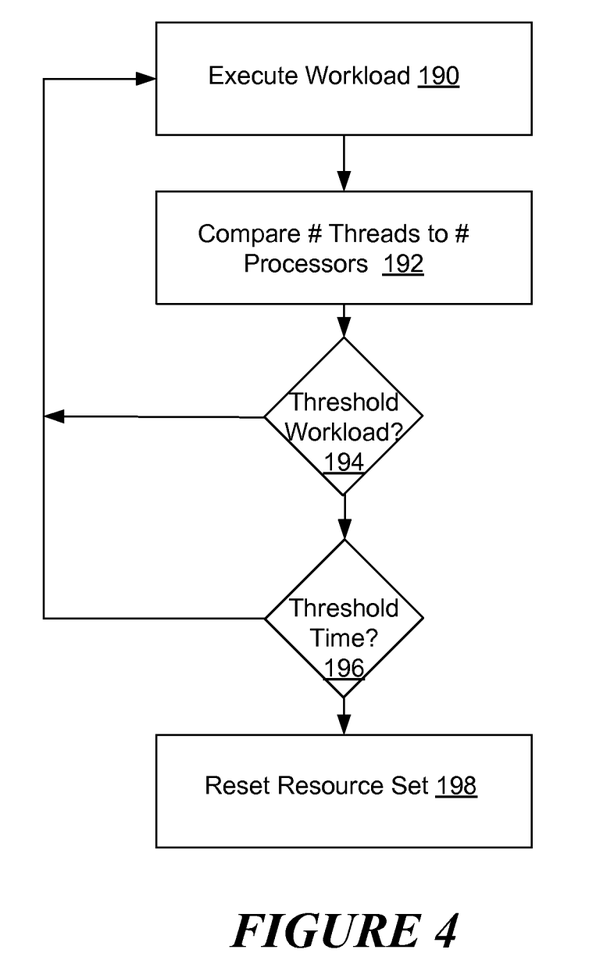
FIG. 4 is a generalized flowchart of the operation of one embodiment of a resource load monitor that monitors resource set utilization.

FIG. 4 is a generalized flowchart of the operation of one embodiment of a resource load monitor that monitors resource set utilization. The process starts at step 190 to execute a workload. At step 192, a comparison is made between the number of runnable threads assigned to the resource set and the number of processors available to execute the threads. At step 194, a determination is made of whether the workload is greater than the threshold, such as by determining that the number of runnable threads exceeds the number of processors available to run the threads. If not, the process returns to step 190 to continue executing the workload. If at step 194, the workload is greater than the threshold, the process continues to step 196 to determine if the workload has been greater than the threshold for a threshold number of increments. If not, the process returns to step 190 to continue to execute. If yes, the process continues to step 198 to reset the resource set.

Figure 5:
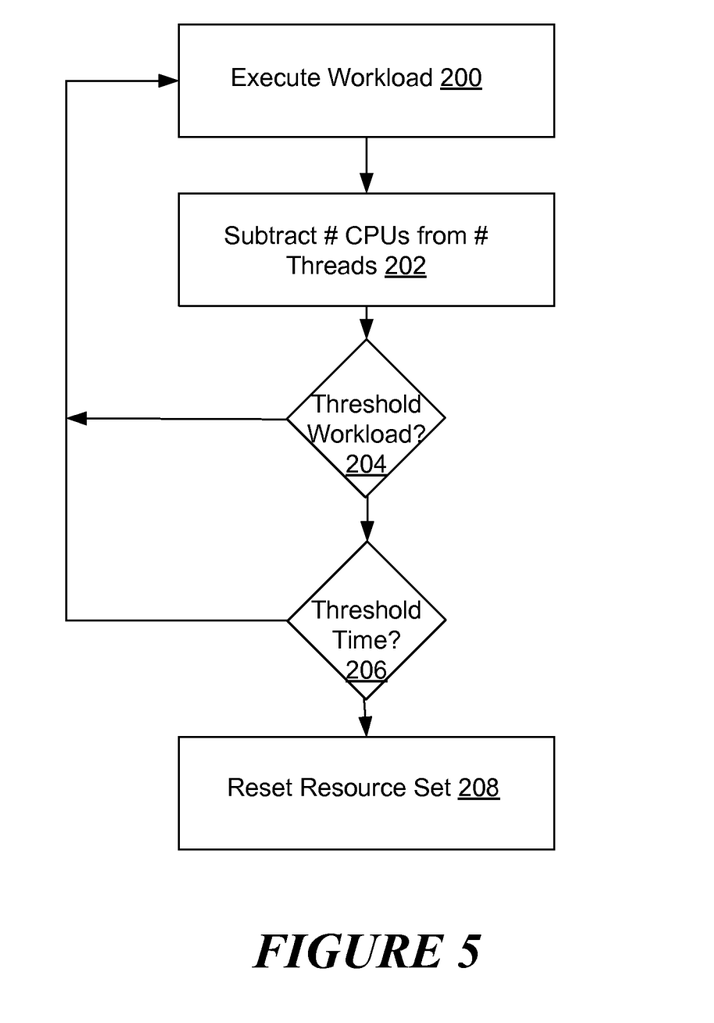
FIG. 5 is a generalized flowchart of the operation of another embodiment of a resource load monitor that monitors resource set utilization.

FIG. 5 is a generalized flowchart of the operation of another embodiment of a resource load monitor that monitors resource set utilization. The process begins at step 200 with execution of a workload, such as one or more processes each having one or more threads. At step 202, the number of processors is subtracted by the number of runnable threads to determine how many excess runnable threads exist. At step 204, a determination is made of whether the excess number of runnable threads exceeds a threshold. If not, then the process returns to step 200. If at step 204 the number of runnable threads exceeds the number of processors by a threshold, the process continues to step 206 to determine if a number of time periods having excess threads exceeds a threshold. If not, the process returns to step 200. If yes, then the process continues to step 20 to reset the resource set to include a higher level of the nested resource set tree.

Although the present invention has been described in detail, it should be understood that various changes, substitutions and alterations can be made hereto without departing from the spirit and scope of the invention as defined by the appended claims.

What is claimed is:

1. A computer-implemented method for employing resource sets to control allocation of resources to processes, wherein the resources include a plurality of physical processors each having a corresponding processor identifier, the method comprising:
    defining at least first and second nested resource sets, each of the nested resource sets having plural resource subsets, each resource subset consisting of a respective, non-overlapping portion of the resources including at least one of the physical processors, each nested resource set having an identifier, and each resource subset having an identifier;
    creating a first process comprising a plurality of threads to run on the resources;
    assigning the first process to a selected resource subset of the plural subsets of the first resource set by association with the resource subset identifier of the selected resource subset, wherein assigning the first process to the selected resource subset restricts the threads of the first process to only execute on the portion of the resources of the selected resource subset, the restricting performed by providing the first process with the processor identifier associated with each of the selected resource subset's at least one physical processor;
    executing the threads on the portion of resources of the selected resource subset;
    determining a resource load threshold associated with the selected resource subset has been met, the determining comprising:
        comparing the number of runnable threads assigned to run in the selected resource subset with the number of physical processors in the selected resource subset; and
        determining the resource load threshold is met in response to the number of runnable threads being greater than the number of physical processors for a predetermined number of consecutive intervals;
    in response to the determining, identifying the runnable threads which are waiting to execute on the selected resource subset's at least one physical processor, wherein at least one of the identified waiting threads is a thread of the first process, and dispatching the identified waiting threads to physical processors of the first nested resource set other than the selected resource subset's at least one physical processor without changing the processor identifiers provided to the first process such that execution of the threads of the first process other than the at least one identified thread of the first process continues to be restricted to the portion of the resources of the selected resource subset; and migrating the at least one identified thread of the first process back to the selected resource subset's at least one physical processor in response to the identified thread of the first process waking up after having gone to sleep.

2. The method of claim 1 wherein the determining further comprises:
    determining the resource load threshold is met in response to the number of runnable threads being greater than the number of physical processors by a predetermined threshold amount greater than one for a predetermined number of consecutive intervals.

3. The method of claim 1 wherein dispatching the identified waiting threads further comprises:
    dispatching the identified waiting threads to physical processors of the second nested resource set when the resource usage of all of the resources of the first nested resource set is holler than a threshold amount.

4. The method of claim 1 wherein the intervals are fixed periodic time intervals and the predetermined number of consecutive intervals is greater than one.

5. A system comprising:
    a plurality of physical processors each having a corresponding processor identifier;
    a data bus coupled to the processor; and
    a computer-usable medium embodying computer program code, the computer-usable medium being coupled to the data bus, the computer program code used for employing resource sets to control allocation of resources to processes, wherein the resources include the plurality of physical processors, the computer program code comprising instructions executable by one or more of the physical processors and configured for:
    defining at least first and second nested resource sets, each of the nested resource sets having plural resource subsets, each resource subset consisting of a respective, non-overlapping portion of the resources including at least one of the physical processors, each nested resource set having an identifier, and each resource subset having an identifier;
    creating a first process comprising a plurality of threads to run on the resources;
    assigning the first process to a selected resource subset of the plural subsets of the first resource set by association with the resource subset identifier of the selected resource subset, wherein assigning the first process to the selected resource subset restricts the threads of the first process to only execute on the portion of the resources of the selected resource subset, the restricting performed by providing the first process with the processor identifier associated with each of the selected resource subset's at least one physical processor;
    executing the threads on the portion of resources of the selected resource subset;
    determining a resource load threshold associated with the selected resource subset has been met, the determining comprising:
        comparing the number of runnable threads assigned to run in the selected resource subset with the number of physical processors in the selected resource subset; and
        determining the resource load threshold is met in response to the number of runnable threads being greater than the number of physical processors for a predetermined number of consecutive intervals;
    in response to the determining, identifying the runnable threads which are waiting to execute on the selected resource subset's at least one physical processor, wherein at least one of the identified waiting threads is a thread of the first process, and dispatching the identified waiting threads to physical processors of the first nested resource set other than the selected resource subset's at least one physical processor without changing the processor identifiers provided to the first process such that execution of the threads of the first process other than the at least one identified thread of the first process continues to be restricted to the portion of the resources of the selected resource subset; and migrating the at least one identified thread of the first process back to the selected resource subset's at least one physical processor in response to the identified thread of the first process waking up after having gone to sleep.

6. The system of claim 5 wherein the determining further comprises:

determining the resource load threshold is met in response to the number of runnable threads being greater than the number of physical processors by a predetermined threshold amount greater than one for a predetermined number of consecutive intervals.

7. The system of claim 5 wherein dispatching the identified waiting threads further comprises:

dispatching the identified waiting threads to physical processors of the second nested resource set when the resource usage of all of the resources of the first nested resource set is higher than a threshold amount.

8. The system of claim 5 wherein the intervals are fixed periodic time intervals and the predetermined number of consecutive intervals is greater than one.

9. A non-transitory, computer-readable storage medium embodying computer program code for employing resource sets to control allocation of resources to processes, wherein the resources include a plurality of physical processors each having a corresponding processor identifier, the computer program code comprising computer executable instructions configured for:

defining at least first and second nested resource sets, each of the nested resource sets having plural resource subsets, each resource subset consisting of a respective, non-overlapping portion of the resources including at least one of the physical processors, each nested resource set having an identifier, and each resource subset having an identifier;

creating a first process comprising a plurality of threads to run on the resources;

assigning the first process to a selected resource subset of the plural subsets of the first resource set by association with the resource subset identifier of the selected resource subset, wherein assigning the first process to the selected resource subset restricts the threads of the first process to only execute on the portion of the resources of the selected resource subset, the restricting performed by providing the first process with the processor identifier associated with each of the selected resource subset's at least one physical processor;

executing the threads on the portion of resources of the selected resource subset;

determining a resource load threshold associated with the selected resource subset has been met, the determining comprising:

comparing the number of runnable threads assigned to run in the selected resource subset with the number of physical processors in the selected resource subset; and determining the resource load threshold is met in response to the number of runnable threads being greater than the number of physical processors for a predetermined number of consecutive intervals;

in response to the determining, identifying the runnable threads which are waiting to execute on the selected resource subset's at east one physical processor, wherein at least one of the identified waiting threads is a thread of the first process, and dispatching the identified waiting threads to physical processors of the first nested resource set other than the selected resource subset's at least one physical processor without changing the processor identifiers provided to the first process such that execution of the threads of the first process other than the at least one identified thread of the first process continues to be restricted to the portion of the resources of the selected resource subset; and migrating the at least one identified thread of the first process back to the selected resource subsets at least one physical processor in response to the identified thread of the first process waking up after having gone to sleep.

10. The non-transitory, computer-readable storage medium of claim 9, wherein the determining further comprises:

determining the resource load threshold is met in response to the number of runnable threads being greater than the number of physical processors by a predetermined threshold amount greater than one for a predetermined number of consecutive intervals.

11. The non-transitory, computer-readable storage medium of claim 9, wherein dispatching the identified waiting threads further comprises:

dispatching the identified waiting threads to physical processors of the second nested resource set when the resource usage of all of the resources of the first nested resource set is higher than a threshold amount.

12. The non-transitory, computer-readable storage medium of claim 9, wherein the intervals are fixed periodic time intervals and the predetermined number of consecutive intervals is greater than one.

* * * * *